United States Patent
Buch et al.

(10) Patent No.: US 10,042,785 B1
(45) Date of Patent: Aug. 7, 2018

(54) STORAGE DRIVE WITH MULTIPLE CONTROLLERS HAVING INTERCONNECTED BUFFER MANAGERS

(71) Applicant: Seagate Technology LLC, Cupertino, CA (US)

(72) Inventors: Bruce Douglas Buch, Westborough, MA (US); Paul Michael Wiggins, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/689,414

(22) Filed: Aug. 29, 2017

(51) Int. Cl.
  *G11C 19/00* (2006.01)
  *G06F 13/16* (2006.01)
  *G06F 13/38* (2006.01)
  *G06F 3/06* (2006.01)
  *G06F 12/0831* (2016.01)

(52) U.S. Cl.
  CPC ........ *G06F 13/1642* (2013.01); *G06F 3/0659* (2013.01); *G06F 3/0674* (2013.01); *G06F 13/385* (2013.01); *G06F 3/061* (2013.01); *G06F 3/0658* (2013.01); *G06F 12/0831* (2013.01)

(58) Field of Classification Search
  CPC .. G06F 13/1642; G06F 3/0659; G06F 3/0674; G06F 13/385; G06F 3/061; G06F 3/0658; G06F 12/0831
  USPC ............................................................ 365/78
  See application file for complete search history.

(56) References Cited

U.S. PATENT DOCUMENTS

| | | | |
|---|---|---|---|
| 6,178,486 B1 | 1/2001 | Gill et al. | |
| 6,763,437 B1 | 7/2004 | Nguyen et al. | |
| 6,868,486 B1 * | 3/2005 | Ward | G06F 13/1605 710/117 |
| 8,090,906 B1 | 1/2012 | Blaha et al. | |

* cited by examiner

*Primary Examiner* — Fernando Hidalgo
(74) *Attorney, Agent, or Firm* — Hollingsworth Davis, LLC

(57) ABSTRACT

A data storage device includes first and second controllers that independently and simultaneously process data from a recording medium. The first and second controllers each have respective first and second buffer managers coupled to respective first and second buffer memories. The first and second buffer managers are coupled to each other via an inter-controller data bus. The first controller is configured to receive a contiguous memory request for a block data transfer client of the first controller. A first part of the request is fulfilled from the first buffer memory via the first buffer manager, and a second part of the request is fulfilled from the second buffer memory via the second buffer manager communicating with the first buffer manager via the inter-controller data bus.

20 Claims, 5 Drawing Sheets

STORAGE DRIVE WITH MULTIPLE CONTROLLERS HAVING INTERCONNECTED BUFFER MANAGERS

SUMMARY

The present disclosure is directed to a storage drive with multiple controllers having interconnected buffer managers. In one embodiment, a storage device includes first and second controllers that independently and simultaneously process data from a recording medium. The first and second controllers each have respective first and second buffer managers coupled to respective first and second buffer memory. The first and second buffer managers are coupled to each other via an inter-controller data bus. The first controller is configured to receive a contiguous memory request for a block data transfer client of the first controller. A first part of the request is fulfilled from the first buffer memory via the first buffer manager, and a second part of the request is fulfilled from the second buffer memory via the second buffer manager communicating with the first buffer manager via the inter-controller data bus.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
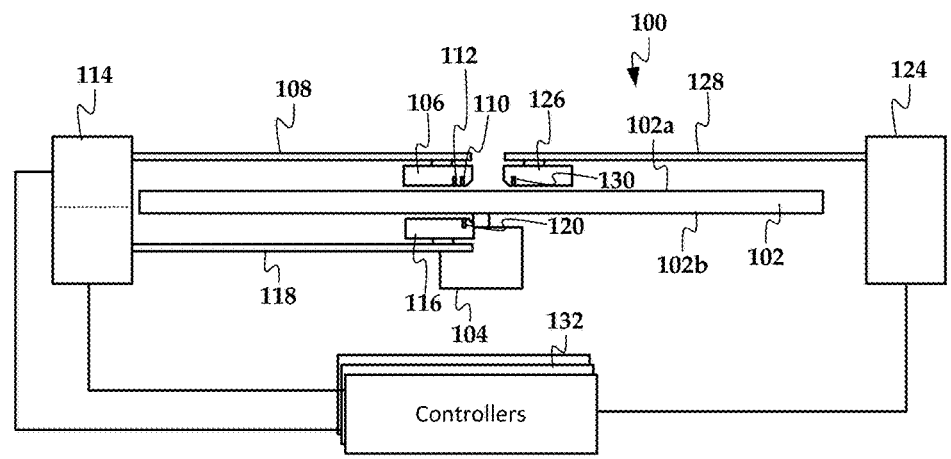
FIG. 1 is a diagram of an apparatus according to an example embodiment.

The present disclosure generally relates to data storage devices that utilize magnetic storage media, e.g., hard disk drives (HDDs). Additional HDD features described herein, generally described as "parallelism" architectures are seen as a way to increase HDD performance measures such as IOPS and latency. Generally, parallelism architectures utilize multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for random data access requests.

In embodiments described below, a hard disk drive includes multiple heads driven by the same or different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. The parallelism architectures is extended to other components that operate in the HDD, including system controllers, servo controllers, read/write channels, host interfaces, caches, etc.

For example, a system controller and other computer circuitry, sometimes referred to as system-on-a-chip (SoC) can be arranged in a master/slave configuration. In such an arrangement, the master SoC can be used to arbitrate some tasks with the host and other system hardware, while both the slave and master can perform some tasks in parallel, such as managing read and write queues targeted for different heads. In order to reduce costs and complexity, the master and slave SoC can use identical hardware components, the master/slave roles being assigned at startup, e.g., by setting different voltages on digital inputs to the controllers. While the embodiment below are described as utilizing a magnetic disk and read/write heads for data storage, the dual-controller implementations described below may be used for other types of storage media, such as flash memory used in solid-state drives (SSD). In such a case, each controller can be coupled to a different set of flash memory dies, or perform multiple access on a signal die.

In an existing master/slave controller architecture, the master SoC's dynamic random access memory (DRAM) and memory interface is designed to support the combined bandwidth of all buffered host and disk transfers, including disk transfers executed by the slave SoC. Because the master and slave use the same SoC, the slave SoC's DRAM is under-utilized in such a configuration. Increasing DRAM bandwidth (e.g., using a wider data bus) adds costs to both SoCs. Embodiments described below distribute the bandwidth load across both master and slave DRAMs, and creates a logical buffer that uses the capacity of both DRAMs. While the controllers are shown and described below in a master/slave configuration, the concepts below may apply to any type of multi-controller arrangement (e.g., peer-to-peer) in which one of the controllers acts as single point of transfer to a block data transfer client and can buffer some of the transfer data to another of the controllers.

In FIG. 1, a diagram illustrates an apparatus 100 with parallelism features according to example embodiments. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. In one embodiment, the slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 (and its associated actuation hardware) may be included instead of or in addition to the second slider 116. The third slider 126 is held over the first surface 102a of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading from and/or writing to disk surface 102a simultaneously with transducers 110, 112 of first slider 106.

In the examples shown in FIG. 1, more than one disk 102 may be used, and the actuators 114, 124 may be coupled to additional heads that access some or all of the additional disk surfaces. In this context, "accessing" generally refers to activating a read or write transducer and coupling the transducer to a read/write channel. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time, as well as accessing different surfaces at the same time. I Two or more controllers 132 are coupled to the respective actuators 114, 124 and control movement of the actuators 114, 124. The controllers 132 may include SoC that perform such operations as servo control, encoding and decoding of data written to and read from the disk 102, queuing and formatting host commands, etc. As described in greater details below, one of the controllers 132 is designated as a master and the others as slaves. Thus, while the controllers 132 may have otherwise identical hardware, they will perform differently, e.g., due to different firmware and/or software instructions that are executed at start up. Note that the firmware/software loaded into the controllers 132 may be the same, but execute differently due to one or more hardware inputs being set differently between the controllers 132.

Figure 2:
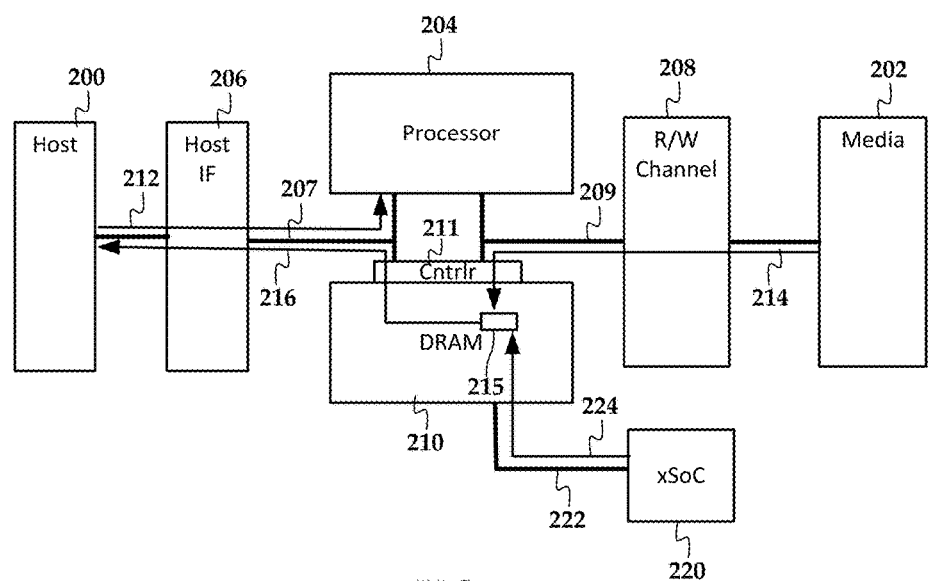
FIG. 2 is a block diagram showing memory access within a system-on-a-chip according to example embodiments.

The present disclosure relates to the use of DRAM in a dual-controller data storage drive. In FIG. 2, a simplified block diagram illustrates how DRAM is used in data transfers between a host 200 and a storage media 202 (e.g., magnetic disk) according to an example embodiment. The host 200 communicates with a processor 204 via a host interface 206. The host interface 206 may include both software and hardware that manages host-to-disk data transfers. The host interface 206 may use any standard host interface specification, such as SATA, NVMe, SCSI, Ethernet, etc. The host interface 206 is coupled to the controller 204 via bus 207.

The processor 204 accesses the storage media 202 via a read/write channel 208. The read/write channel 208 is a functional block that includes a number of different hardware and software components, including amplifiers, filters, decoders, encoders, error correction, etc. Where the recording media 202 includes a disk, the signals processed by the read/write channel 208 will include read signals generated by a read transducer (e.g., magnetoresistive sensor) and write signals received by a write transducer (e.g., write coil). If the recording medium includes solid state memory, the read/write channel may include address selection logic, read/write registers and buffers, etc. The read/write channel 208 is coupled to the processor 204 and DRAM 210 via bus 209. This bus 209 is shown separately from the bus 207 coupled to the host interface 206, although may be the same. In other embodiments, the host interface 206, 208 may be coupled to the processor 204 via one or more peripheral busses (e.g., southbridge) while the DRAM 210 is coupled to the processor 204 via a memory bus (e.g., northbridge). The DRAM 210 is used as buffer storage in this example, however it will be understood that any internal or external volatile or non-volatile memory can be used together with or in place of the DRAM 210.

An example read transaction is illustrated, in which the host 200 sends a request 212 for data from the media 202. The processor 204 parses the requests, and locates the requested data on the recording media 202 (e.g., determining tracks and sectors in which the data is stored, performing a logical-to-physical address translation). The data is located on the media 202 and a stream 214 containing the requested data is stored at a location 215 of the DRAM 210 via the read/write channel 208. Once the data 215 is stored in DRAM 210, it can be sent (via stream 216) from the DRAM 210 to the host 200 via the host interface 206. The data 215 may be purged or remain in DRAM 210 after the request is fulfilled. For example, the DRAM 210 may be used as a read cache, in which case the data 215 may stay in the DRAM 210 for some amount of time if it is likely that the data 215 may be requested again.

Where two or more identical SoCs are used, an SoC interconnect bus may be used, as indicated by interface 220. This interface 220 (also referred to herein as an inter-controller interface) may be able to place data in DRAM 210 directly, as indicated by bus 222, or via a peripheral bus (not shown) coupled to the processor 204, and the processor places data in the DRAM 210 via a memory bus. A memory controller 211 may be used to manage these memory requests. Because there is usually just one host interface 206 in a data storage drive, one of the multiple SoCs (e.g., the master) are used to transfer data to and from the host 200. Thus, as indicated by data stream 224, if the request 212 was fulfilled by a second SoC (not shown), the data would be stored in DRAM 210 via the SoC interconnect 220.

If the SoCs were arranged so that the DRAM 210 of one SoCs stored all incoming and outgoing host data, then the SoCs would be designed with the master SoC having DRAM of sufficient size to manage all host data. However, this would leave the DRAM of slave SoCs (which would have identical hardware as the master) being underutilized. Therefore, in embodiments described below, the SoC interconnect is designed such that some portion of the memory can be shared (e.g., interleaved) between multiple SoCs. In such embodiments, a transfer such as data stream 224 can be performed together with data stream 214 to fulfill the read request 212. Data transfers can also be performed in the other direction such that the memory in a master SoCs can be utilized by a slave SoC.

Figures 3, 4, 5, 6:
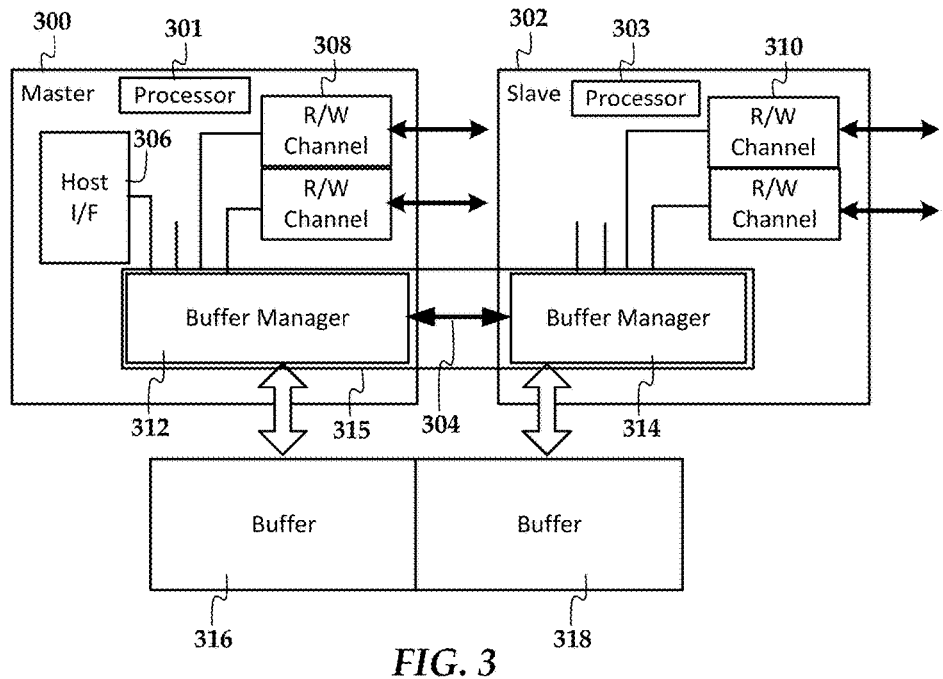
FIG. 3 is a block diagram of a dual system-on-a-chip arrangement according to an example embodiment.
FIGS. 4, 5, and 6 are block diagrams showing mapping of memory stripes for a dual system-on-a-chip memory buffer arrangement according to an example embodiment.

In FIG. 3, a block diagram illustrates a dual-SoC memory arrangement according to an example embodiment. Two controller SoCs 300, 302 are connected via an inter-controller bus 304 that forms a data path from the host interface 306 of the master SoC 300 to read/write channels 308, 310 of both the master and slave SoCs 300, 302. This strategy uses two identical instances of the same type of a single controller SoC design to obviate the non-recurring cost of designing separate SoCs for the master and slave roles. The controller SoCs 300, 302 each include one or more processors 301, 303 (e.g., microcontrollers, digital signal processors) that perform the functions of the host interface 306, channels 308, 310 and other functional blocks. The processors 301, 303 may operate using any combination of firmware, hardware, and custom logic circuitry. Note that only the master SoC 300 is shown with a host interface 306, as this SoC 300 manages host communications. However, since the slave SoC 302 includes the same hardware as the master SoC 300, the slave SoC 302 may also include hardware and/or software that enables a host interface. However, such host interface may be disabled when the slave SoC 302 is configured, e.g., at startup.

The SoCs 300, 302 include buffer managers 312, 314 that communicate via the inter-controller bus 304. The buffer managers 312, 314 are coupled to respective buffers 316, 318. Note that the buffers 316, 318 may be incorporated into the respective SoCs 300, 302, e.g., formed on the same wafer as other components, soldered onto a substrate, attached using through-silicon-vias, externally attached via a connector, etc. The buffers 316, 318 may be DRAM, static RAM (SRAM), flash memory, etc. In order to fully utilize the data transfer rate of the buffers 316, 318, the transfer rate of the inter-controller bus 304 should be at least half that of the buffer's data transfer rate.

The buffer managers 312, 314 form a distributed buffer 315 that coordinate memory requests from clients (e.g., host interface 306, channels 308, 310, interface for inter-controller bus 304) such that memory storage is interleaved across both buffers 316, 318, hereby allowing the SoC designs to equalize the use of buffers between the two SoCs 300, 302. The distributed buffer 315 extends the concept of enhancing bandwidth with multi-chip parallelism to the buffer memory system. The view created for buffer clients by the distributed buffer 315 is that of a single logical data buffer that features the combined capacity and bandwidth of the physical master and slave buffers 316, 318. The distribution of memory between buffers 316, 318 is handled within the buffer managers 312, 314 and hidden from the clients.

In one embodiment of the distributed buffer architecture, the individual buffer managers 312, 314 of master and slave SoCs 300, 302 collaborate over the inter-controller bus 304 to present block data transfer clients in both SoCs with the image of a high-bandwidth buffer service. The buffer managers 312, 314 distribute stripes of the data between their respective buffers. For purposes of this discussion, a "block" is used to reference a unit of host data transfer and/or media storage, e.g., 512B or 4K blocks that correspond to one or more physical sectors/pages. In contrast, a "stripe" refers to the unit of data stored contiguously in a particular one of the two or more non-contiguous memory locations. For example, in the two buffers 316, 318, logically contiguous stripes of data are stored in different non-contiguous memory locations, e.g. stripe n in buffer 316 and stripe n+1 in buffer 318. In this configuration, the buffer managers 312, 314 map alternate 2N-byte stripes (e.g., 64 bytes) of logical buffer space to the master and slave buffers 316, 318.

In the example shown in FIG. 3, all even logical stripes may map to locations in the master buffer 316, and all odd logical stripes map to locations in the slave buffer 318. For purposes of this disclosure, for a stripe size of n-bytes, the even stripes are at addresses A, A+2n, A+4n, . . . and the odd stripes are at addresses A+n, A+3n, A+5n, . . . , where A is starting address that may or may not be zero. Where address A is non-zero, addresses from zero to A−1 may be used for non-striped memory access as described elsewhere herein, or reserved for other system purposes. In a similar manner a non-striped range of addresses may be established above a striped range of addresses.

In the above embodiment, the stripe sizes are a power of two, e.g., 64 bytes, 128 bytes, 256 bytes, etc. In other embodiments, the stripe size may not be a power of two. For example, the stripe size could be the size of a host block (or a multiple or fraction thereof), including redundancy fields that make it larger than a simple power of two. This may be practical for some types of memory that have different access overhead rules than DRAM or other buffer memory types described herein.

In FIGS. 4-6, block diagrams illustrate mapping of memory in a dual-SoC system according to an example embodiment. In FIG. 4, the shading of a series of logical stripes indicates where memory is physically located within two different SoCs. In particular, the shaded stripes are located in the master buffer 316 and the unshaded stripes are located in the slave buffer 318. The hexadecimal numbers in each box shows the logical address ranges of the 64-byte locations mapped to that stripe. In FIG. 5, a table shows the local address ranges of the master buffer 316 used by the master buffer manager 312 with the corresponding logical address ranges located inside the shaded stripes as shown in FIG. 4. In FIG. 6, the table shows the local addresses of the slave buffer 318 used by the slave buffer manager 314 with the associated logical address located inside the unshaded stripes as shown in FIG. 4.

Figure 7:
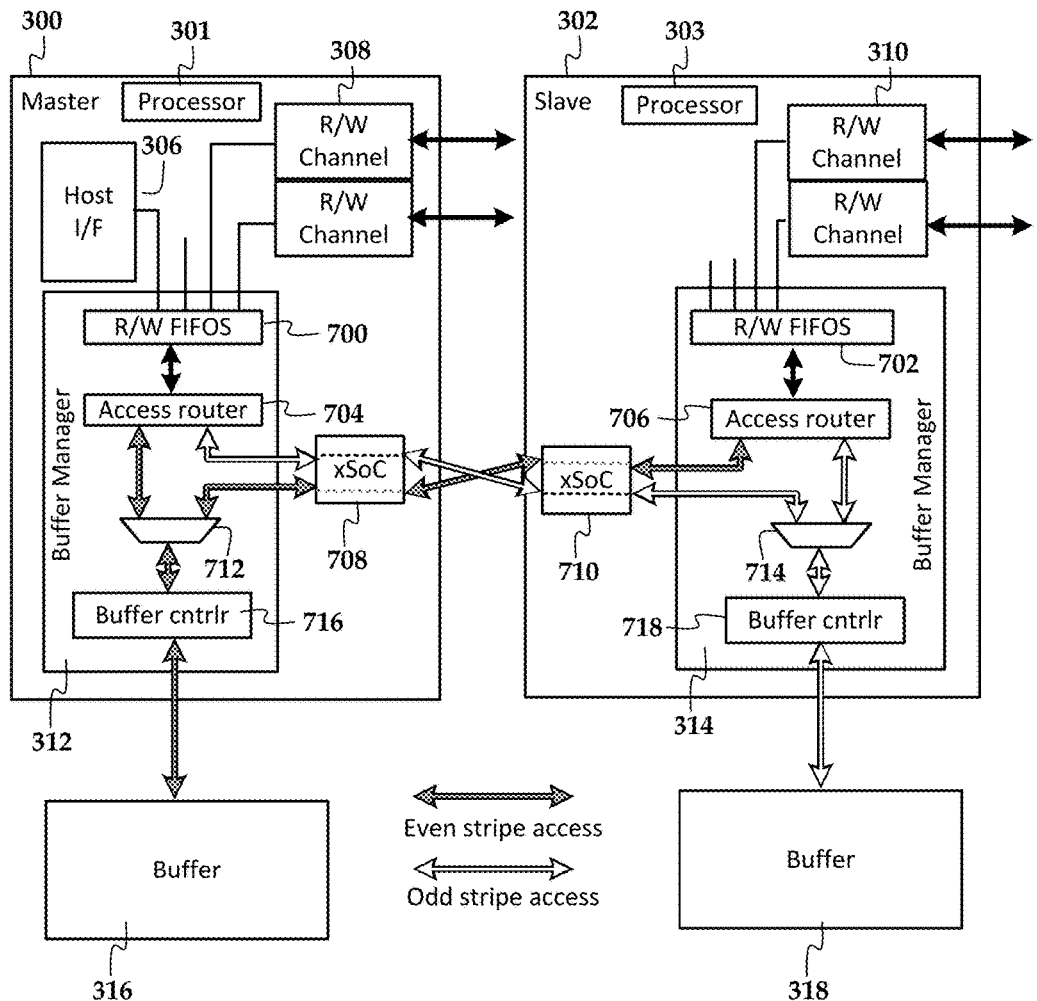
FIG. 7 is a block diagram showing additional details of the dual system-on-a-chip arrangement shown in FIG. 3.

In FIG. 7, a block diagram illustrates additional details of the system shown in FIG. 3, using the same reference numbers for the same or similar components. The buffer managers 312, 314 of the respective SoCs 300, 302 include read/write first-in, first-out (FIFO) queues 700, 702, access routers 704, 706, inter-SoC interfaces 708, 710, multiplexers 712, 714, and buffer controllers 716, 718. When a client reads or writes an extent of buffer data having a length that is large relative to the length of a stripe, roughly half of the data is read from or written to the local buffer, and the other half is read from or written to the remote buffer via the inter-SOC interface.

In the example of FIG. 7, the master's access router 704 directs accesses mapped to even logical stripes to its own buffer controller 716, as indicated by shaded lines between the access router 704, multiplexer 712, buffer controller 716, and buffer 316. The master's access router 704 accesses data mapped to odd logical stripes to the slave's buffer controller 708 as indicated by the unshaded lines from the access router 704, inter-SoC interfaces 708, 710, multiplexer 714, buffer controller 718, and buffer 318. The slave's access router 706 does the converse when servicing requests from its own clients, namely locally servicing odd logical stripes and remotely servicing even logical stripes via inter-SoC interfaces 708, 710. The splitting of data accesses to the two separate buffers is hidden from the block data transfer clients, which are provided with the vision of a single, unified buffer memory.

Figure 8:
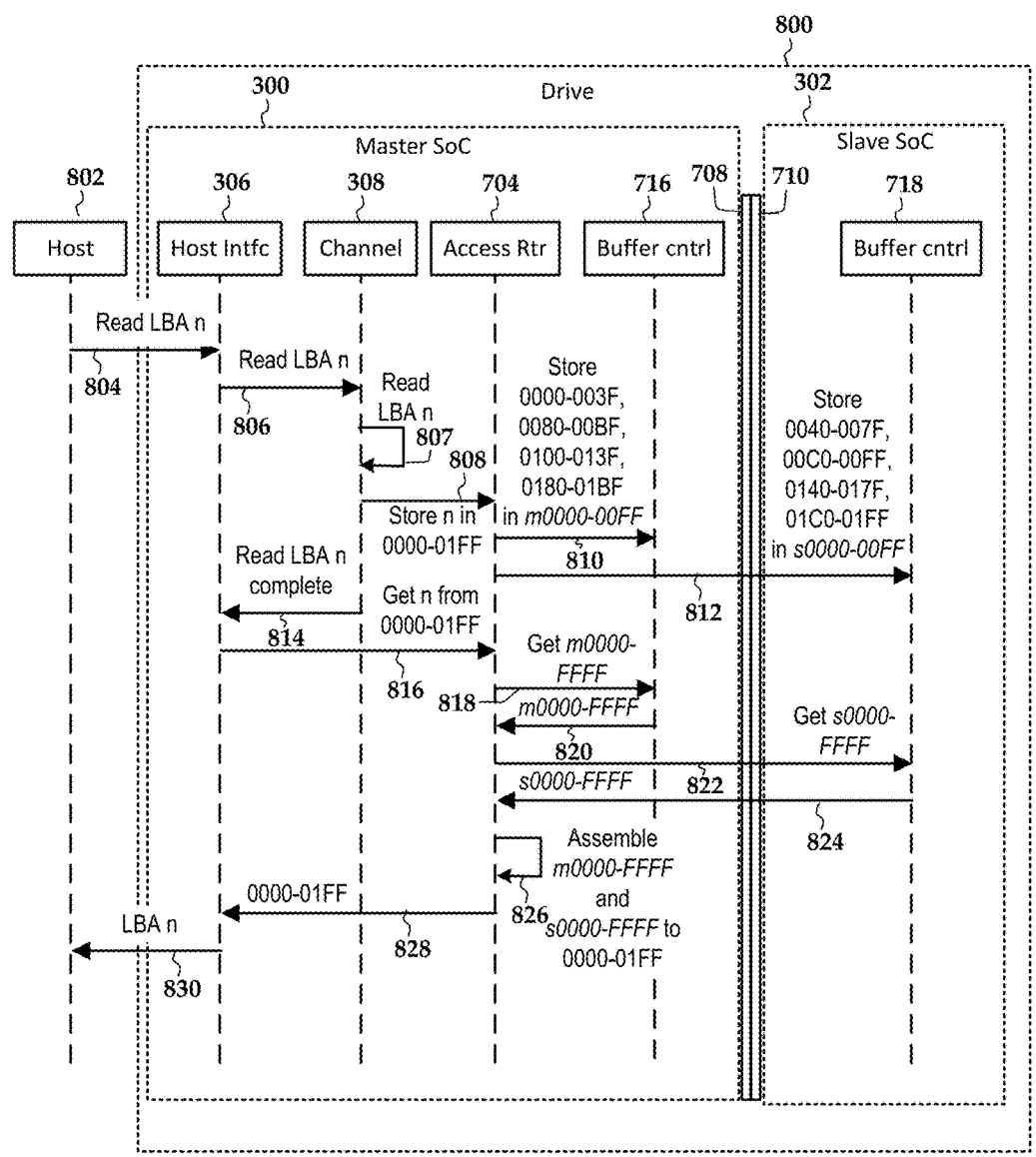
FIG. 8 is a sequence diagram of a memory operation on a system-on-a-chip arrangement according to an example embodiment.

In FIG. 8, a sequence diagram illustrates an example of memory access on a data storage drive 800 according to an example embodiment. The drive 800 includes dual-SoCs 300, 302 as previously shown in FIG. 7 and described above. A host 802 makes a request 804 via the host interface 306, which instructs the channel 308 to retrieve data from the storage medium. In this example, the data request 804 is for a single 512-byte sector at logical block address (LBA) n, which is located on a portion of the recording medium accessible by the master SoC 300. The master SoC channel 308 reads 807 the data from the storage medium and stores it 808 via the access router 704.

In this example, the channel 308 specifies a logical client address in which to store 808 the data, namely the range from 0000-01FF. In this example, it is assumed that the memory is striped between master and slave buffers as indicated in FIGS. 4-6. Therefore, parts of the data (logical addresses ranges 0000-003F, 0080-00BF, 0100-013F, and 0180-01BF) are stored 810 via the master buffer controller 716 into the master buffer (not shown). The local or physical address is shown in the figure are prepended with an 'm' or 's' and are drawn in italics. Thus data in storage command 810 goes to local/physical address in the master's DRAM at address range 0000-00FF.

The access router 704 also performs a second buffer storage operation 812, this operation placing logical address ranges 0040-007F, 00C0-00FF, 0140-017F, and 01C0-01FF into local/physical address range 0000-00FF of the slave SoC buffer (not shown). This command is achieved via the inter-SoC interfaces 708, 710. Once the channel signals 814 that the read is completed, the host interface 306 reads 816 the data from buffer via the access router 704 using the logical address 0000-01FF provided by the channel 308. The access router 704 performs read operations 818, 820, 822, 824 for the appropriate local/physical addresses of the buffer controllers 716, 718. The retrieved data is assembled into the original order stored by the channel 308 at operation 808. This data is then streamed 828 from the access router 704 to the host interface 306, which streams the data 830 to the host 802, thereby fulfilling the host command 804.

While the above embodiments can equalize buffer utilization between multiple SoCs, this may incur latency due to remote buffer accesses over the inter-SOC interface. Some measures can be taken to minimize these latencies. For example, the striped buffer mapping as shown in FIGS. 4-6 could be used for only buffering block data transfers, with block sufficiently large relative to stripe size to reap the benefit of 2X bandwidth of the internal buffer memory interface relative to the buffer memory connected to a single SoC. A buffer memory controller cognizant of block sizes could pre-fetch stripes of data before the data is needed. Pre-fetching can be done even in systems where buffer memory requests are for portions of logical blocks, as supported in some storage controllers.

Awareness of block size also allows the SoC to issue a single request over the inter-SoC interface for a block, and allows the transfer of all remotely-mapped stripes of a block to be pushed from the sending side to the receiving side, regardless of whether the operation is a buffer read or write operation. In the case of a write, the single indication to transfer the write data to the slave memory could be sent once all stripes destined for the slave memory are stored in the master R/W queue. The R/W queues 700, 702 shown in FIG. 7 can be used to order the separately-arriving and pre-fetched even and odd stripe read data into logically-sequential streams, and can buffer incoming write data while waiting for its alternate stripes to be dispatched to local and remote buffers. In this way, non-contiguous and interleaved stripes are transferred over the inter-controller bus using a single data transfer operation.

In some embodiments, only a range of logical address space used for block data buffering would use the striped mapping described above. A range of logical space in each SOC would be conventionally mapped to a range of memory in just its local buffer to service requests that are not from block data transfer clients. This range can be used for non-block data, such as processor code, tables and/or metadata only used by the local SoC.

In the above embodiments, the inter-controller bus and interfaces are shown exchanging data stripes, and such exchanges may also include metadata that describes the stripes, e.g., addresses and other identifiers, description of stripe size and/or quantities, etc. The inter-controller communications via the inter-controller bus may also exchange other data that is not directly related to pending or current stripe data transfers. For example, the two buffer managers may exchange data that facilitates synchronizing activity that makes the memory interfaces unavailable for data transfer activity. Examples of such synchronized activities would be refresh of DRAM, periodic updates of memory bus communications data, periodic impedance calibration, etc. Examples of memory bus communications includes DDR PHY, which is an interface protocol between a double data rate (DDR) memory controller and a DDR physical interface (PHY) for DDR memory devices.

Figure 9:
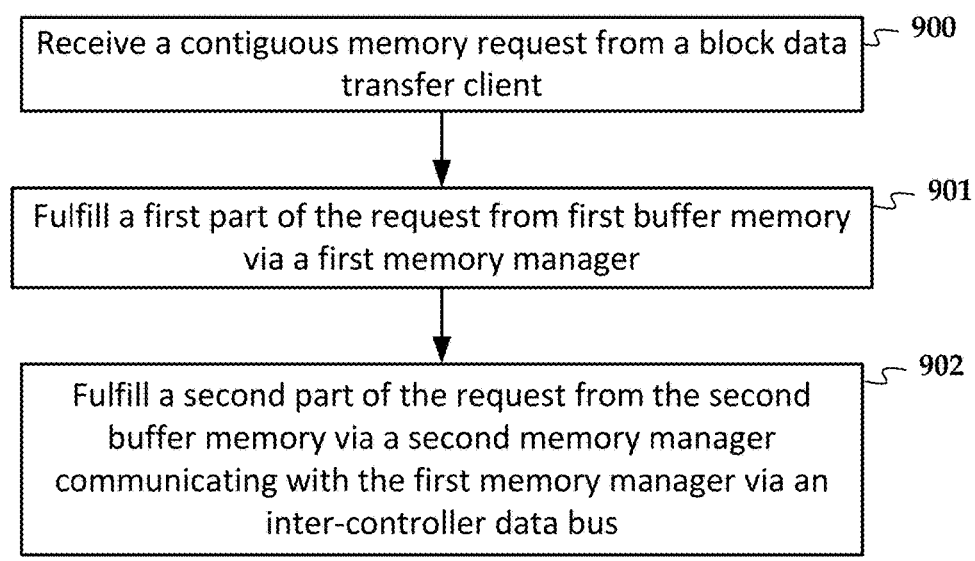
FIG. 9 is a flowchart of a method according to an example embodiment.

Generally, the activities described above that make the DRAM (or other type of memory) unavailable for use will tend to disrupt transfer of stripe data to or from the striped memory regions, and therefore decrease system performance. The disruption of such events to stripe data transfers will be lessened if the activity on each independent memory interface is overlapped/synchronized significantly or completely. Communication over the inter-controller interfaces and bus can be used to schedule such activity as simultaneously as possible in the two buffer managers In FIG. 9, a flowchart shows a method according to an example embodiment. The method involves receiving 900 a contiguous memory request for a block data transfer client of a first controller of a data storage drive. The first controller is coupled to a second controller via an inter-controller data bus. The first controller has a first buffer manager coupled to a first buffer memory, and a first part of the request is fulfilled 901 from the first buffer memory via the first buffer manager. The second controller has a second buffer manager coupled to a second buffer memory A second part of the request is fulfilled 902 from the second buffer memory via the second buffer manager communicating with the first buffer manager via the inter-controller data bus.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   first and second controllers that independently and simultaneously process data from a recording medium of the apparatus, the first and second controllers each comprising respective first and second buffer managers coupled to respective first and second buffer memory, the first and second buffer managers coupled to each other via an inter-controller data bus, the first controller configured to:
   receive a contiguous memory request for a block data transfer client of the first controller;
   fulfill a first part of the request from the first buffer memory via the first buffer manager; and
   fulfill a second part of the request from the second buffer memory via the second buffer manager communicating with the first buffer manager via the inter-controller data bus.

2. The apparatus of claim 1, wherein the first and second controllers comprise identical instances of a system-on-a-chip configured for master and slave roles.

3. The apparatus of claim 1, wherein the first part of the request comprises a plurality of even data stripes and the second part of the request comprises odd data stripes interleaved between the even-addressed data stripes.

4. The apparatus of claim 1, wherein a first non-block memory access request in the first controller is fulfilled from the first buffer memory via the first buffer manager and a second non-block memory access request in the second controller is fulfilled from the second buffer memory via the second buffer manager.

5. The apparatus of claim 4, wherein the first and second non-block memory access requests each comprise one of processor code, tables or meta-data used only by the respective first and second controllers.

6. The apparatus of claim 1, wherein the recording medium comprises one or more magnetic disks, and the first and second controllers are coupled to first and second heads that independently access the one or more magnetic disks.

7. The apparatus of claim 1, wherein the recording medium comprises one or more solid-state memories coupled to the first and second controllers.

8. The apparatus of claim 1, wherein the block data transfer clients comprise one of a read/write channel and a host interface.

9. The apparatus of claim 8, wherein the first controller comprises the host interface, and wherein all data transfers between the apparatus and an external host occur via the host interface, and wherein the fulfilling of the first and second parts of the request from the first and second buffer memory distributes block data of the data transfers between the first and second buffer memory.

10. The apparatus of claim 1, wherein the first part of the request comprise a first plurality of stripes and the second part of the request comprises a second plurality of stripes with logical addresses interleaved between that of the first plurality of stripes, wherein the second part of the request is fulfilled by a single data transfer of the second plurality of stripes via the inter-controller data bus.

11. A method comprising:
    receiving a contiguous memory request for a block data transfer client of a first controller of a data storage drive, the first controller being coupled to a second controller of the data storage drive via an inter-controller data bus, the first controller comprising a first buffer memory coupled to a first buffer manager, the second controller comprising a second buffer memory coupled to a second buffer manager;
    fulfilling a first part of the request from the first buffer memory via a first buffer manager; and
    fulfilling a second part of the request from the second buffer memory via the second buffer manager communicating with the first buffer manager via the inter-controller data bus.

12. The method of claim 11, wherein the first and second controllers comprise identical instances of a single system-on-a-chip configured for master and slave roles.

13. The method of claim 11, wherein the first part of the request comprises a plurality of even data stripes and the second part of the requests comprises odd data stripes interleaved between the even-addressed data stripes.

14. The method of claim 11, further comprising:
    receiving a non-block memory access request comprising one of processor code, tables and meta-data used only by the first controller; and
    fulfilling the non-block data request only from the first buffer memory via the first buffer manager.

15. The method of claim 11, wherein the first part of the request comprise a first plurality of stripes and the second part of the request comprises a second plurality of stripes with logical addresses interleaved between that of the first plurality of stripes, wherein the second part of the request is fulfilled by a single data transfer of the second plurality of stripes via the inter-controller data bus.

16. The method of claim 11, wherein the block data transfer clients comprise one of a read/write channel and a host interface.

17. The method of claim 16, wherein the first controller comprises the host interface, and wherein all data transfers between the apparatus and an external host occur via the host interface, and wherein the fulfilling of the first and second parts of the request from the first and second buffer memory distributes block data of the data transfers between the first and second buffer memory.

18. A data storage drive, comprising:
    two or more data storage media sections; and
    master and slave controllers comprising identical instances of a system-on-a-chip (SoC), the SoC comprising:
    a read/write channel operable to communicate with at least one of the two or more data storage media sections;
    a buffer manager coupled to the read/write channel and configured to store and retrieve data from a volatile memory of the SoC;
    a block transfer client operable to store contiguous blocks of data via the buffer manager; and
    an inter-controller interface coupled to the buffer manager; and
    an inter-controller bus coupling the inter-controller interfaces of the master and slave controllers, the buffer managers of the slave and master controllers being configured to divide the contiguous blocks of data into stripes and interleave the stripes between the volatile memory of the master and slave controllers via the inter-controller bus in response to requests from the respective block transfer clients.

19. The data storage drive of claim 18, wherein the buffer managers of the slave and master controllers are configured to transfer a plurality of non-contiguous, interleaved stripes over the inter-controller bus using a single data transfer.

20. The data storage drive of claim 18, wherein block transfer client of the master controller comprises a host interface, and wherein all data transfers between the data storage drive and an external host occur via the host interface.

\* \* \* \* \*